(12) United States Patent
Gajdeczko et al.

(10) Patent No.: US 7,272,976 B2
(45) Date of Patent: Sep. 25, 2007

(54) PRESSURE SENSOR

(75) Inventors: Boguslaw Gajdeczko, Princeton, NJ (US); Kevin J. Violette, Woodbury, CT (US)

(73) Assignee: ASML Holdings N.V., Veldhoven (NL)

( * ) Notice: Subject to any disclaimer, the term of this patent is extended or adjusted under 35 U.S.C. 154(b) by 0 days.

(21) Appl. No.: 10/812,098

(22) Filed: Mar. 30, 2004

(65) Prior Publication Data

US 2005/0217384 A1 Oct. 6, 2005

(51) Int. Cl.
*G01L 13/02* (2006.01)
(52) U.S. Cl. ...................................... 73/716
(58) Field of Classification Search ............ 73/861.47, 73/37, 37.5, 37.8, 800, 705, 716
See application file for complete search history.

(56) References Cited

U.S. PATENT DOCUMENTS

| | | | | |
|---|---|---|---|---|
| 3,322,980 A | * | 5/1967 | Faure | 310/319 |
| 3,625,616 A | * | 12/1971 | Lee | 356/517 |
| 4,270,560 A | * | 6/1981 | Kearney | 137/68.14 |
| 4,521,683 A | * | 6/1985 | Miller | 250/221 |
| 4,543,831 A | * | 10/1985 | Meyer | 73/705 |
| 4,550,592 A | * | 11/1985 | Dechape | 73/37.5 |
| 4,655,086 A | * | 4/1987 | Mielnicka-Pate et al. | 73/646 |
| 4,665,747 A | * | 5/1987 | Muscatell | 73/386 |
| 4,869,282 A | * | 9/1989 | Sittler et al. | 137/15.01 |
| 4,933,545 A | * | 6/1990 | Saaski et al. | 250/227.14 |
| 4,953,388 A | * | 9/1990 | Barada | 73/37.5 |
| 5,252,826 A | * | 10/1993 | Kemp | 250/231.19 |
| 5,281,782 A | * | 1/1994 | Conatser | 200/83 J |
| 5,570,428 A | * | 10/1996 | Madaffari et al. | 381/191 |
| 5,880,841 A | * | 3/1999 | Marron et al. | 356/512 |
| 6,014,239 A | * | 1/2000 | Veligdan | 398/134 |
| 6,052,613 A | * | 4/2000 | Takaki | 600/479 |

(Continued)

FOREIGN PATENT DOCUMENTS

GB 922982 A 4/1963

(Continued)

OTHER PUBLICATIONS

Search Report for Singapore Patent Application No. 200501991-4 mailed May 15, 2006, 7 pages.

(Continued)

*Primary Examiner*—Max Noori
(74) *Attorney, Agent, or Firm*—Sterne, Kessler, Goldstein & Fox, P.L.L.C.

(57) ABSTRACT

A pressure gauge includes a diaphragm having a substantially rigid outer portion and a displaceable inner portion that displaces in response to a pressure difference between first and second sides of the diaphragm. The pressure gauge further includes a sensor located proximate to the diaphragm and adapted to sense the displacement of the diaphragm inner portion. The pressure gauge further includes a monitor and control system coupled to the sensor (wired or wireless), and adapted to determine the pressure difference from the displacement of the diaphragm. The sensor and the monitor and control system can be implemented with one or more optical sensing designs, capacitive sensing designs, or other devices used to measure sub-micron displacements. For low pressure applications, such as lithography applications, the diaphragm is sensitive to pressure changes in a range of approximately 0.1 to 0.5 inches of water. The diaphragm and sensor have a relatively high bandwidth and can thus be implemented in relatively high speed applications. The invention can be implemented in, for example, lithography proximity sensing equipment and lithography topographical mapping equipment.

9 Claims, 8 Drawing Sheets

U.S. PATENT DOCUMENTS

| | | | |
|---|---|---|---|
| 6,105,436 A * | 8/2000 | Lischer et al. | 73/724 |
| 6,496,265 B1 * | 12/2002 | Duncan et al. | 356/479 |
| 6,856,399 B2 * | 2/2005 | Kuskovsky et al. | 356/457 |
| 6,892,583 B2 * | 5/2005 | Baek | 73/715 |
| 2002/0003917 A1 * | 1/2002 | Sherrer et al. | 385/12 |
| 2002/0011114 A1 * | 1/2002 | Miyashita et al. | 73/718 |
| 2004/0099060 A1 * | 5/2004 | Kijlstra et al. | 73/714 |
| 2004/0118183 A1 * | 6/2004 | Gajdeczko et al. | 73/37.5 |
| 2004/0118184 A1 * | 6/2004 | Violette | 73/37.5 |

FOREIGN PATENT DOCUMENTS

| | | | |
|---|---|---|---|
| GB | 1 374 775 A | 11/1974 | |

OTHER PUBLICATIONS

U. Schnell and R. Dändliker, "*Dispersive White-Light Interferometry for Absolute Distance Measurement with Dieletric Multilayer Systems on the Target,*" Optics Letters, Apr. 1, 1996, pp. 528-530, vol. 21, No. 7, Optical Society of America, Washington, DC.

Qiu, Taiqing, "*Project Report Prepared for Silicon Valley Group, Inc. on Fiber Optic Focus Sensors: Theoretical Model,*" Aug. 23, 2000, pp. 1-57, Version B, Department of Mechanical Engineering, Massachusetts Institute of Technology, Cambridge, MA.

* cited by examiner

PRESSURE SENSOR

BACKGROUND OF THE INVENTION

1. Field of the Invention

The invention relates to high sensitivity, high bandwidth, low pressure sensors and, more particularly, to the application of these devices in air gauges for use in, for example, lithography devices.

2. Related Art

Conventional low pressure air gauges utilize mass flow sensors, which have relatively long response times, or low bandwidths, typically in the range of a tens of Hz. The relatively low bandwidths are not suitable for higher speed operations, such as, for example, lithography scanning applications.

What are needed therefore are high sensitivity, low pressure air gauges having higher bandwidths than are presently available.

SUMMARY OF THE INVENTION

The present invention is directed to high sensitivity, low pressure air gauges having higher bandwidths than are presently available.

A pressure sensor in accordance with the invention includes a diaphragm having a substantially rigid outer portion and a displaceable inner portion that displaces in response to a pressure difference between first and second sides of the diaphragm. The pressure gauge further includes a sensor located proximate to the diaphragm and adapted to sense the displacement of the diaphragm inner portion. The pressure gauge further includes a monitor and control systems coupled to the sensor (wired or wireless), and adapted to determine the pressure difference from the displacement of the diaphragm.

The present invention provides a variety of optional sensing designs including, without limitation, optical sensing designs and capacitive sensing designs.

For low pressure applications, such as nanometer proximity sensors used in lithography applications, the operational pressure range of the sensor is approximately 0.1 to 0.5 inches of water. The resolution of the gauge pressure sensor is preferably approx. ~0.001 Pa, this is approx. ~$4\times10^{-5}$ inches H$_2$O. This would allow the gauge to resolve a few nanometers. Note that 1 (one) inch H$_2$O=254 Pascals.

The diaphragm and sensor have a relatively high bandwidth and can thus be implemented in relatively high speed applications. The invention can be implemented in, for example, lithography proximity sensing equipment and lithography topographical mapping equipment.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 1 is a side plan view of a pressure sensor 100, including a diaphragm 102 and a sensor 104.

FIG. 2A. is a front plan view of the diaphragm 102.

FIG. 2B is a side plan view of a substantially rigid outer portion 202 of the diaphragm 102.

FIG. 2C is a side plan view of the diaphragm 102, including the substantially rigid outer portion 202, an inner portion 204, and a proximity sensor surface 206 shown distended as if under a differential pressure condition.

FIG. 3 is a side perspective view of the pressure sensor 100, wherein the sensor 104 and a monitor and control system 106 are implemented with a white-light interferometer.

FIG. 4 is a side plan view of the pressure sensor 100, wherein the sensor 104 and the monitor and control system 106 are implemented with an optical grazing angle sensor.

FIG. 5 is a side plan view of the pressure sensor 100, wherein the sensor 104 includes a capacitive sensor 502, and the proximity sensor surface 206 includes a grounded plate 504.

FIG. 6 is a side plan view of an air system 600, including a first leg 602 and a second leg 604, and the pressure sensor 100 positioned in a bridge therebetween.

DETAILED DESCRIPTION OF THE INVENTION

I. Introduction

The present invention is directed to low pressure air gauges having higher bandwidths than are presently available. The present invention can be used in, for example, and without limitation, lithography proximity sensing and lithography topographical mapping.

II. High Bandwidth, Low Differential Pressure Sensing

Figure 1:
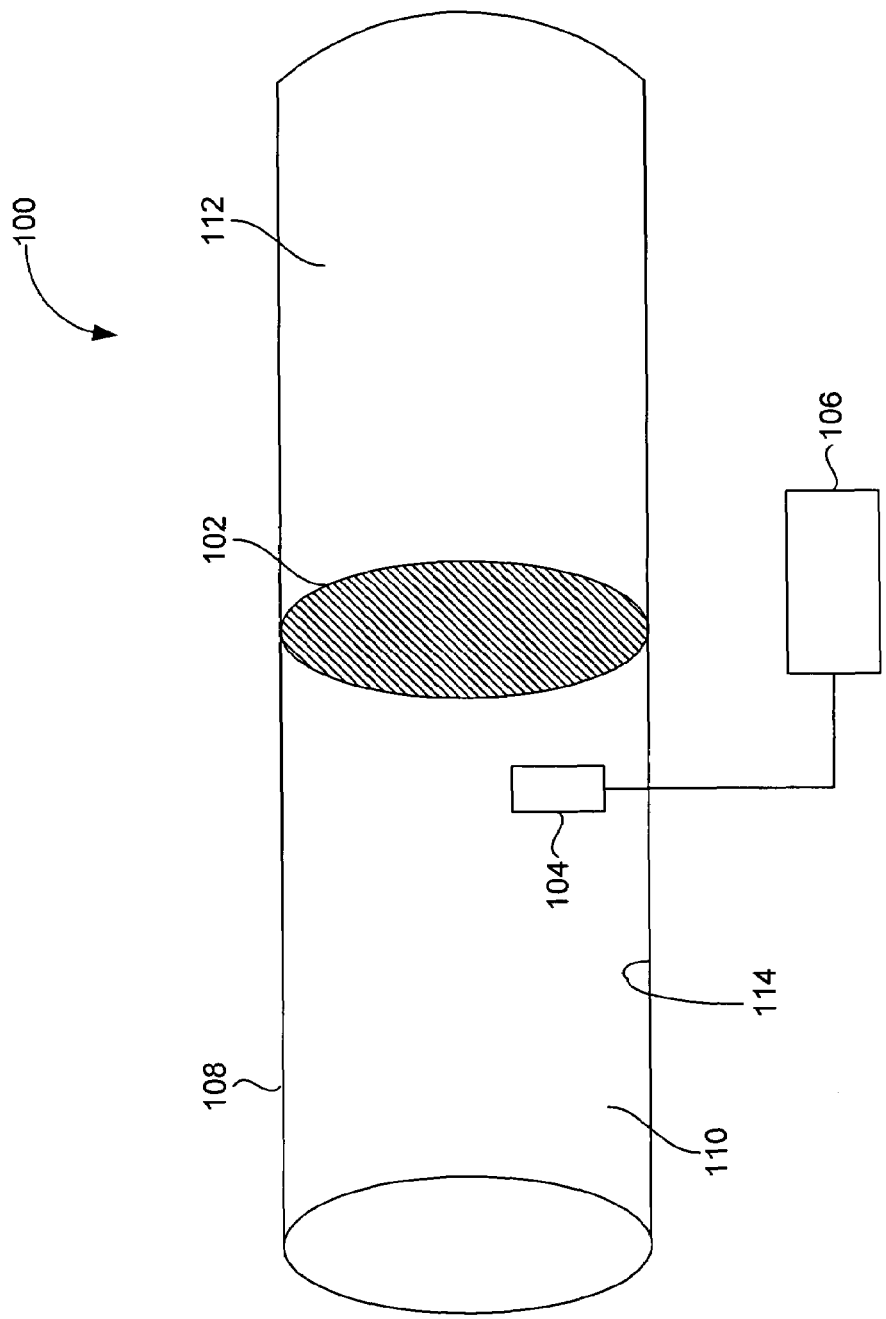

FIG. 1 is a side plan view of a pressure sensor 100 including a flexing plate or diaphragm 102, a diaphragm displacement sensor 104 (hereinafter "sensor" 104) located proximate to the diaphragm 102, and a monitor and control system 106 electrically coupled (wired or wireless) to the sensor 104. The sensor 104 is proximate to the diaphragm, but not necessarily in physical contact with the diaphragm.

The diaphragm 102 and the sensor 104 are positioned within a body 108, between a first area 110 and a second area 112. The pressure sensor 100 determines a pressure difference between the first area 110 and the second area 112.

Figure 2C:
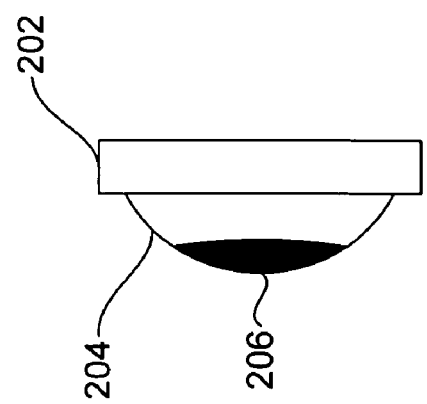
Figure 2B:
Figure 2A:
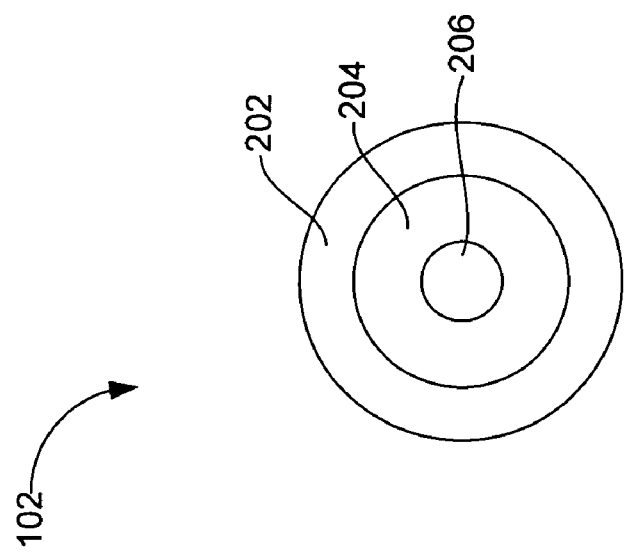

FIG. 2A is a front plan view of the diaphragm 102. The diaphragm 102 includes a substantially rigid outer portion 202, for coupling the diaphragm 102 to an inner wall 114 (FIG. 1) of the body 108. FIG. 2B is a side plan view of the substantially rigid outer portion 202. The substantially rigid outer portion 202 is made from metal, plastic, or other suitable substantially rigid material, or combinations thereof.

Referring back to FIG. 2A, the diaphragm 102 further includes a displaceable inner portion 204 that displaces in response to a pressure difference between the first and second areas 110 and 112 (FIG. 1).

The inner portion 204 is a flexing-plate, membrane-based portion constructed of a semi-elastic material, such as, for example and without limitation, mylar, kapton, rubber, and/or combinations thereof. The inner portion 204 expands in the direction of low pressure. The inner portion 204 is designed to respond to ultra low differential pressure in the range of, for example, and without limitation, approximately 0.1 to 0.5 inches of water. Alternatively, the inner portion 204 is designed to respond to other pressure differential ranges.

The inner portion 204 is attached to the substantially rigid outer portion 202 in one or more of a variety of manners including, without limitation, glue, integrally forming, heat sealing, chemical bonding, and the like.

The inner portion 204 optionally includes a proximity sensor surface 206, wherein the sensor 104 (FIG. 1) is sensitive to movement of the proximity sensor surface 206. The proximity sensor surface 206 can be the inner portion 204 or a coating or impregnation thereof. Example coatings and impregnations are disclosed in one or more sections below.

FIG. 2C is a side plan view of the diaphragm 102, including the substantially rigid outer portion 202, the inner portion 204, and the proximity sensor surface 206 shown distended as if under a differential pressure condition.

In the example of FIGS. 1 and 2A, the body 108 has a cylindrical shape, thus the outer portion 202 has a complementary circular shape. The invention is not, however, limited to the example circular shape illustrated herein. One skilled in the relevant art(s) will understand that other shapes can be utilized as well, including, without limitation, oval, elliptical, and polygon.

The sensor 104 and the proximity sensor surface 206 can be implemented with one or more of a variety of technologies. Example implementations of the sensor 104 and the proximity sensor surface 206 are disclosed below. The invention is not, however, limited to these example implementations. Based on the teachings herein, one skilled in the relevant art(s) will understand that the sensor 104 and the proximity sensor surface 206 can be implemented with other technologies as well, which are within the scope of the present invention.

The pressure sensor 100 is a relatively high bandwidth device. Depending upon the materials and circuitry employed, the pressure sensor can have a bandwidth in the several thousands of Hz. The present invention is thus useful in both relatively low speed applications, such as, for example, lithography proximity sensing, and in relatively higher speed applications, such as, for example, lithography topography mapping.

III. Interferometer Based Prximity Sensing

Figure 3:
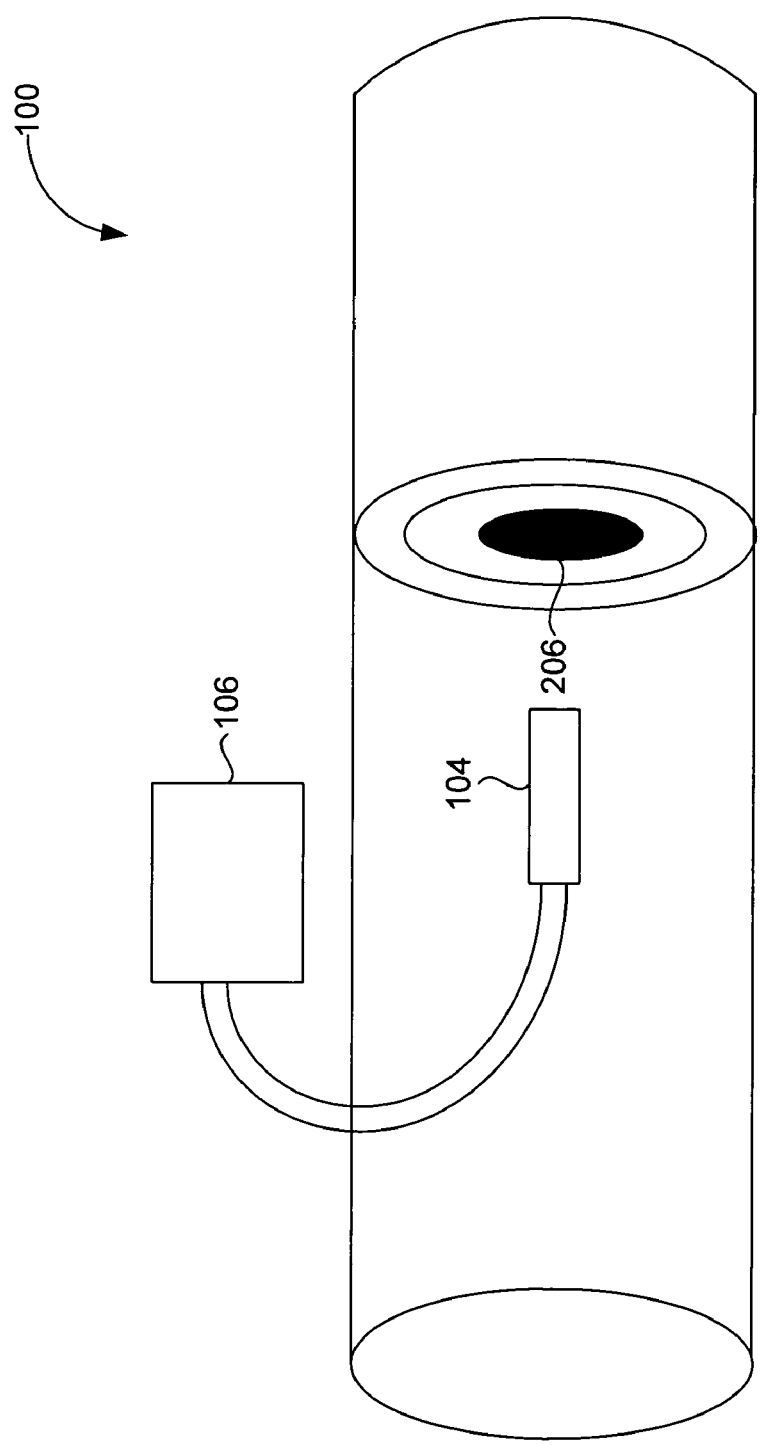

FIG. 3 is a side perspective view of the pressure sensor 100, wherein the sensor 104 and the monitor and control system 106 are implemented with an interferometer. The interferometer utilizes the proximity sensor surface 206 as a reflecting target. Changes in the deflection of the proximity sensor surface 206 result in corresponding changes to reflected light patterns received by the sensor 104. A decoder within the monitor and control system 106 determines the relative deflection of the proximity sensor surface 206. The monitor and control system 106 then converts the deflection measurement of the proximity sensor surface 206 to a pressure difference between the first and second areas 110 and 112.

The interferometer can be implemented with an off-the-shelf interferometer, including, but not limited to, a white light interferometer.

IV. Optical Grazing Angle Proximity Sensing

Figure 4:
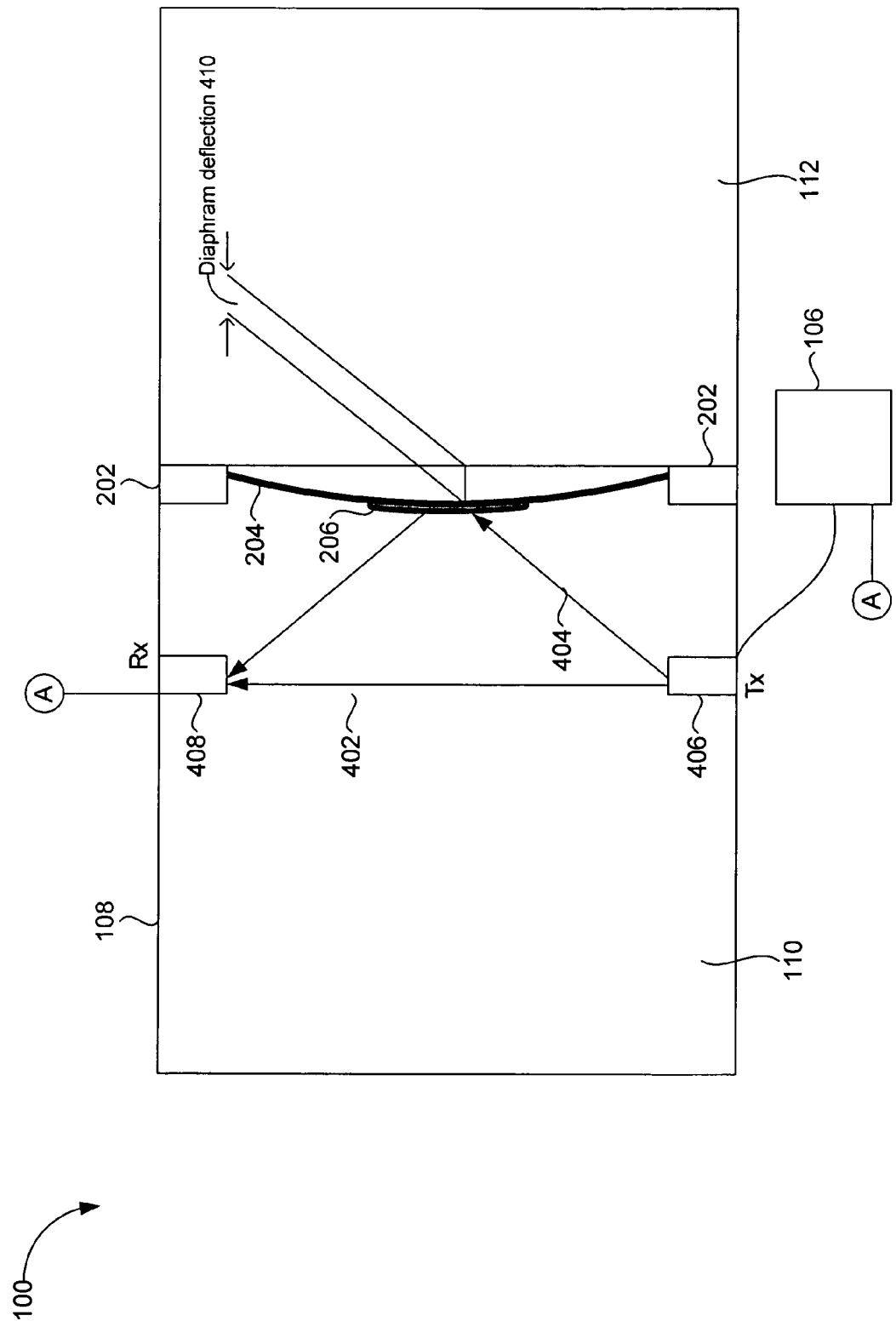

FIG. 4 is a side plan view of the pressure sensor 100, wherein the sensor 104 and the monitor and control system 106 are implemented with an optical grazing angle sensor as taught in, for example, T. Qui, "Fiber Optics Focus Sensors: Theoretical Model," MIT Report, 2000, incorporated herein by reference in its entirety.

In operation, first and second optical paths 402 and 404, respectively, are formed between transmitting and receiving fibers 406 and 408, respectively. The first optical path 402 is between the transmitting fiber 406 and the receiving fiber 408. The second optical path 404 is output from the transmitting fiber 406 and reflects off the proximity sensor surface 206 before being received by the receiving fiber 408. A first beam of light transmitted from the transmitting fiber 406 and received by the receiving fiber 408, via the first optical path 402, and a second beam of light transmitted from the transmitting fiber 406 and received by the receiving fiber 408, via the second optical path 404, form a spatial diffraction pattern. The pattern is a function of the relative position of the proximity sensor surface 206.

When the proximity sensor surface 206 deflects, illustrated in FIG. 4 as "diaphragm deflection" 410, the receiving fiber 408 receives intensity-modulated light from the second path 404. A decoder in the monitor and control system 106 decodes the modulation and determines a relative deflection of the proximity sensor surface 206. The monitor and control system 106 then converts the deflection measurement of the proximity sensor surface 206 (i.e., "diaphragm deflection" 410) to a pressure difference between the first and second areas 110 and 112.

In the example of FIG. 4, the transmitting fiber 406 includes optics that split a light from a light source into the first and second paths 402 and 404. Alternatively, two transmitting fibers are used with acoustically shifted wavelengths. The resulting interference pattern at the receiving fiber 408 constantly shifts or moves. When the proximity sensor surface 206 is motionless, the interference pattern moves with a constant speed. When the proximity sensor surface 206 moves, the speed of the corresponding shifting interference pattern changes. A counter in the monitor and control system 106 decodes the relative deflection of the diaphragm based on the pattern changes. The monitor and control system 106 then converts the deflection measurement of the proximity sensor surface 206 to a pressure difference between the first and second areas 110 and 112.

V. Capacitive Proximity Sensing

Figure 5:
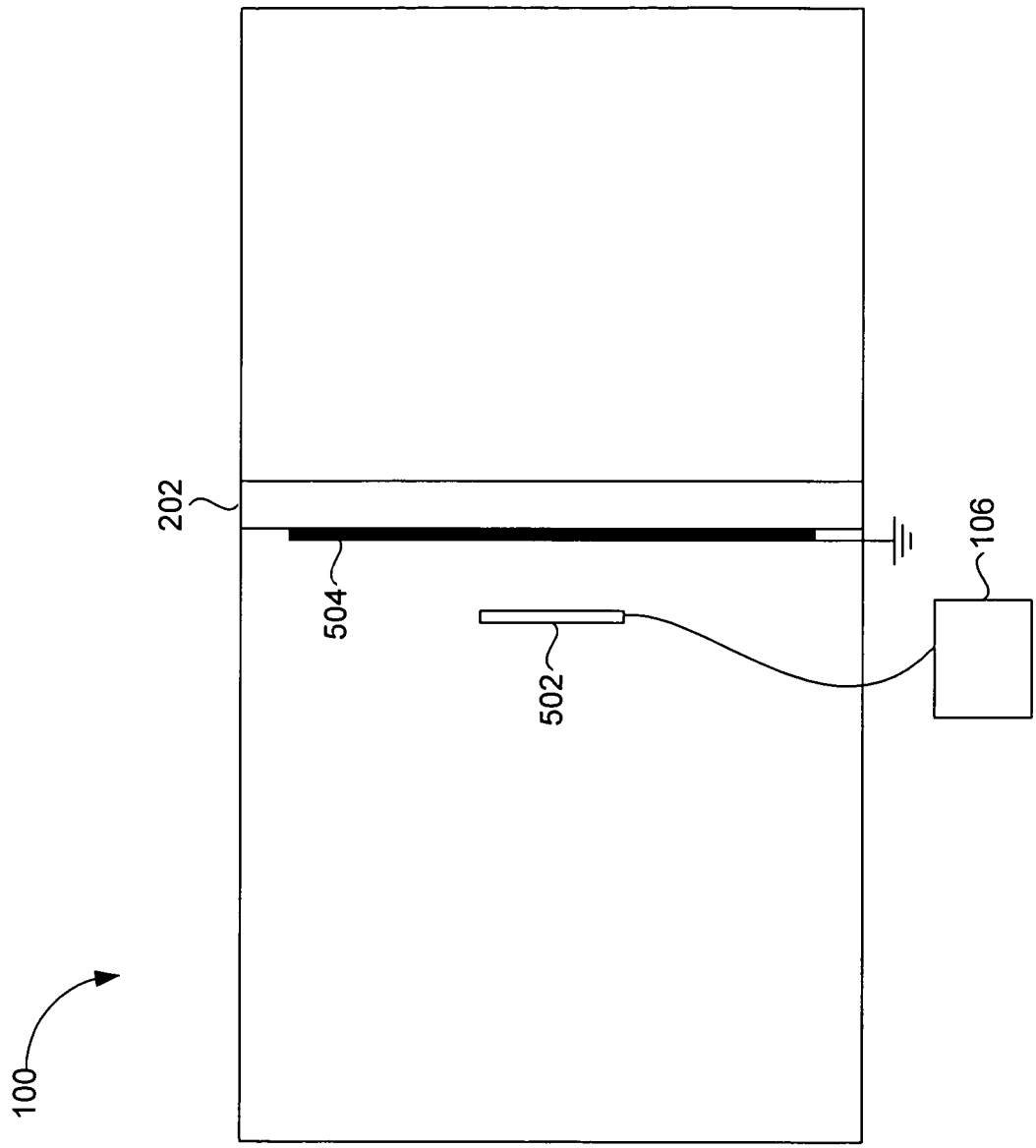

FIG. 5 is a side plan view of the pressure sensor 100, wherein the sensor 104 includes a capacitive sensor 502, and the proximity sensor surface 206 includes a grounded plate 504. The grounded plate 504 is made, at least in part, from conductive material such as metal. The capacitive sensor 502 is optionally located approximately 300 to 500 micrometers from the grounded plate 504. Gas, such as air, acts as a dielectric between the capacitive sensor 502 and the grounded plate 504, thus forming a capacitor. The capacitance is a function of the distance of the grounded plate 504 from the capacitive sensor 502. Changes in the deflection of the diaphragm 102 result in changes to the capacitance. The monitor and control system 106 include circuitry, such as a tank circuit, for example, which generate an oscillation or modulation corresponding to the capacitive changes. The oscillation or modulation is then converted to a relative deflection measurement for the grounded plate 504. The monitor and control system 106 then converts the deflection measurement of the grounded plate 504 to a pressure difference between the first and second areas 110 and 112.

Capacitive sensors are well known and commercially available, although they are not known by the present inventors to have been used in conjunction with pressure sensors.

VI. The Pressure Gauge as an Air Gauge

The pressure sensor 100 is optionally implemented as an air gauge that measures pressure changes caused by air flow. Such an air gauge is useful in, for example and without limitation, proximity sensors for lithography and topographical mapping for lithography.

Figure 6:
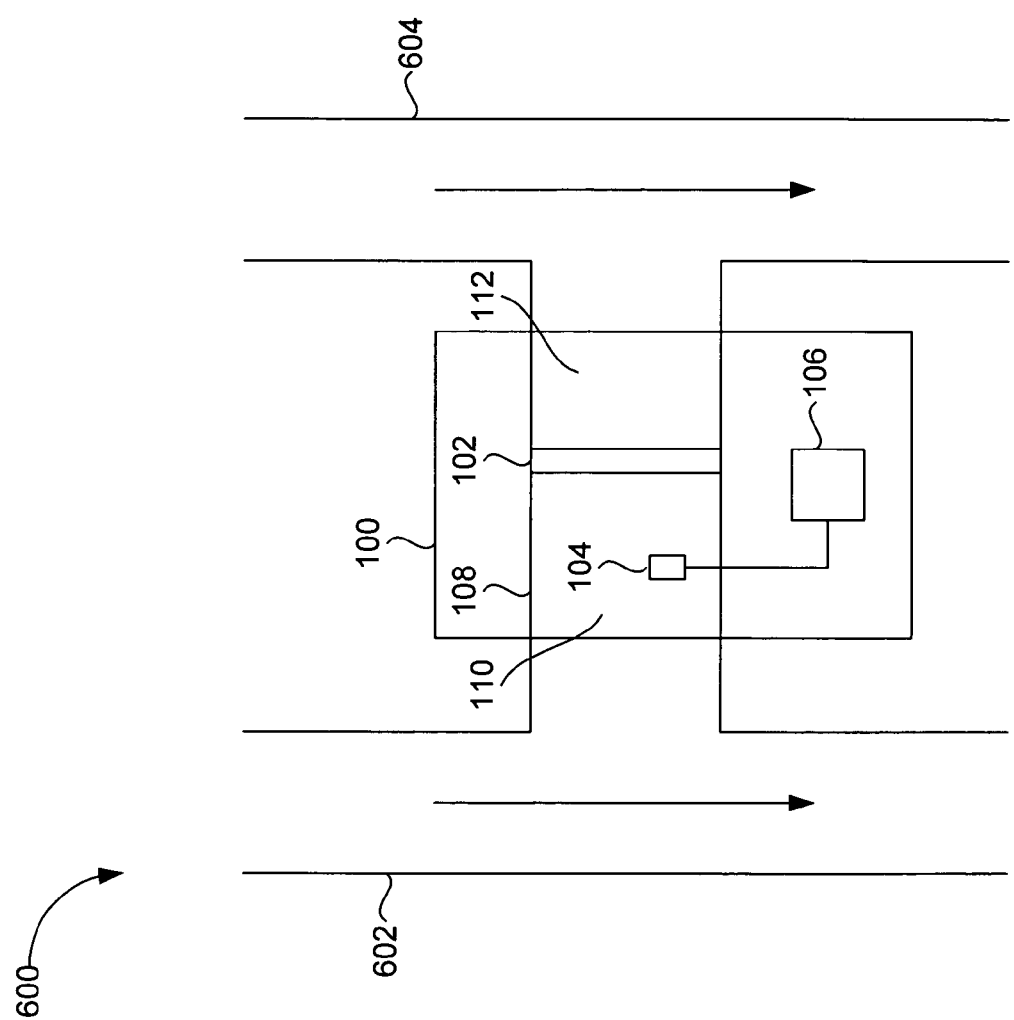

FIG. 6 is a front plan view of an air system 600, including a first leg 602 and a second leg 604. The pressure sensor 100 is positioned in the body 108, which forms a bridge between the first and second legs 602 and 604. The bridge 108 is coupled to the first and second legs by respective T-connections.

In the example of FIG. 6, the T-connections are essentially right angle T-connections. The invention is not, however, limited to right angle T-connections. Based on the description herein, one skilled in the relevant art(s) will understand that other angle connections can be used.

Air flow through the first and second legs 602 and 604 are illustrated with arrows. The air flow results in reduced pressure in areas 110 and 112. When the air flow in leg 602 differs from the air flow in leg 604, the resulting pressure difference between areas 110 and 112 will cause the diaphragm 102 to deflect toward the area of lower pressure. Based on an initial calibration, the monitor and control system 106 determines relative differences in air flow between the first and second legs 602 and 604. The relative difference in air flow can be used, for example, in lithography proximity sensing, as described below.

VII. Lithography Proximity Sensing

Figure 7:
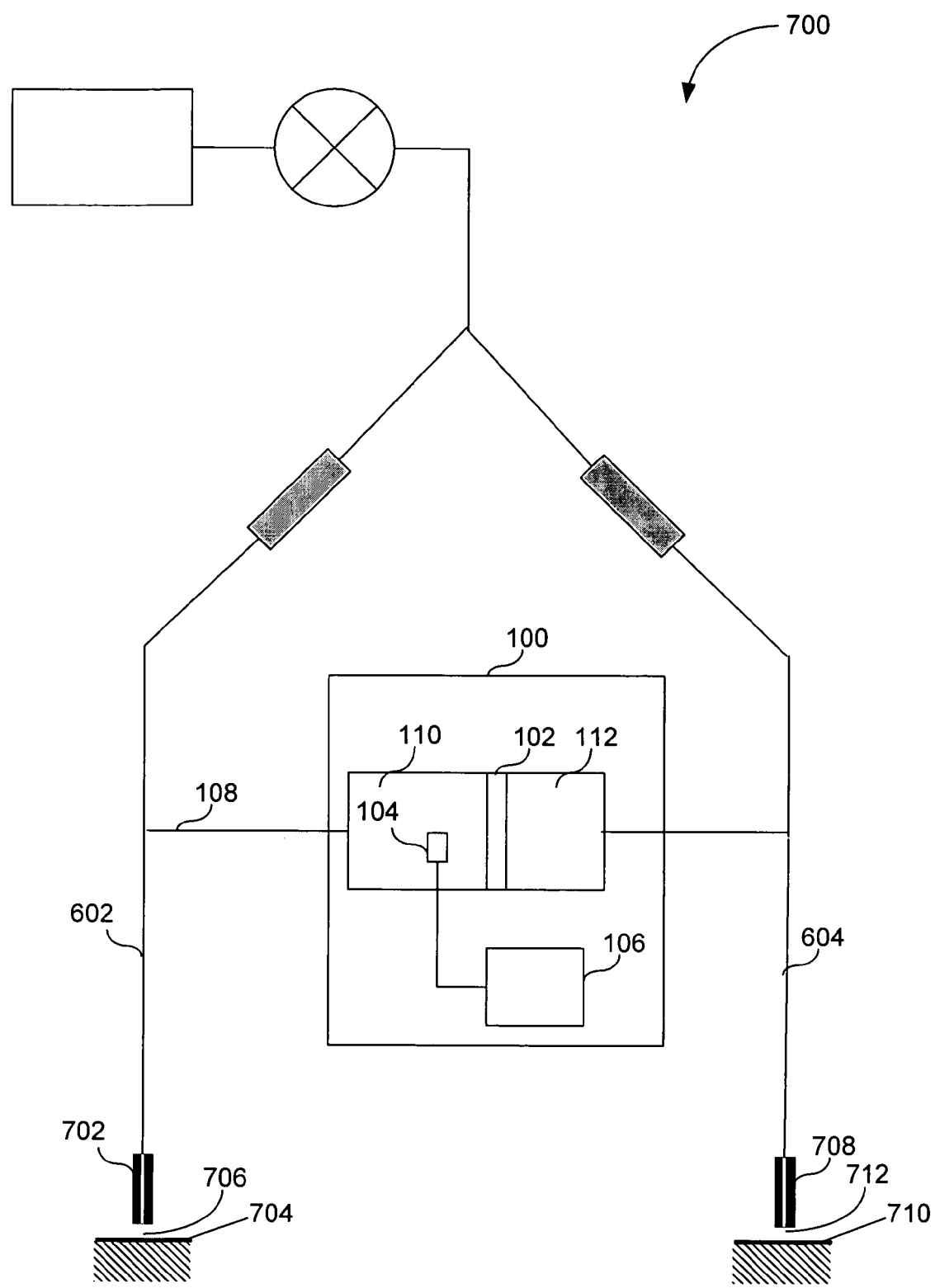
FIG. 7 is a side plan view of the pressure sensor 100 implemented in a proximity sensor 700 used in, for example, lithography.

FIG. 7 is a front plan view of a proximity sensor 700 used in, for example, lithography. Lithography proximity sensors are described in, for example, U.S. patent application Ser. No. 10/322,768, titled, "High-Resolution Gas Gauge Proximity Sensor," filed Dec. 19, 2002, incorporated herein by reference in its entirety. An air gauge sensor is also taught in U.S. Pat. No. 4,953,388, titled, "Air Gauge Sensor," issued Sep. 4, 1990, to Barada, incorporated herein by reference in its entirety.

In FIG. 7, the proximity sensor 700 includes the first and second legs 602 and 604. The first leg 602 is coupled to a measurement probe 702. The second leg 604 is coupled to a reference probe 708. The first leg 602 is a measurement leg, and the second leg 604 is a reference leg. The measurement probe is adjacent to a wafer or other work surface 704, with a measurement gap 706 therebetween. The reference probe is adjacent to a reference surface 704, with a reference gap 712 therebetween.

The air flow in the first and second legs 602 and 604 are initially balanced, resulting in no air pressure difference between areas 110 and 112. When the measurement gap 706 changes relative to the reference gap 712, the air flow in the first leg 602 changes relative to the air flow in the second leg 604, causing a corresponding pressure change in area 110 relative to the area 112. The pressure change is sensed by the pressure sensor 100, as described in sections above.

Figure 8:
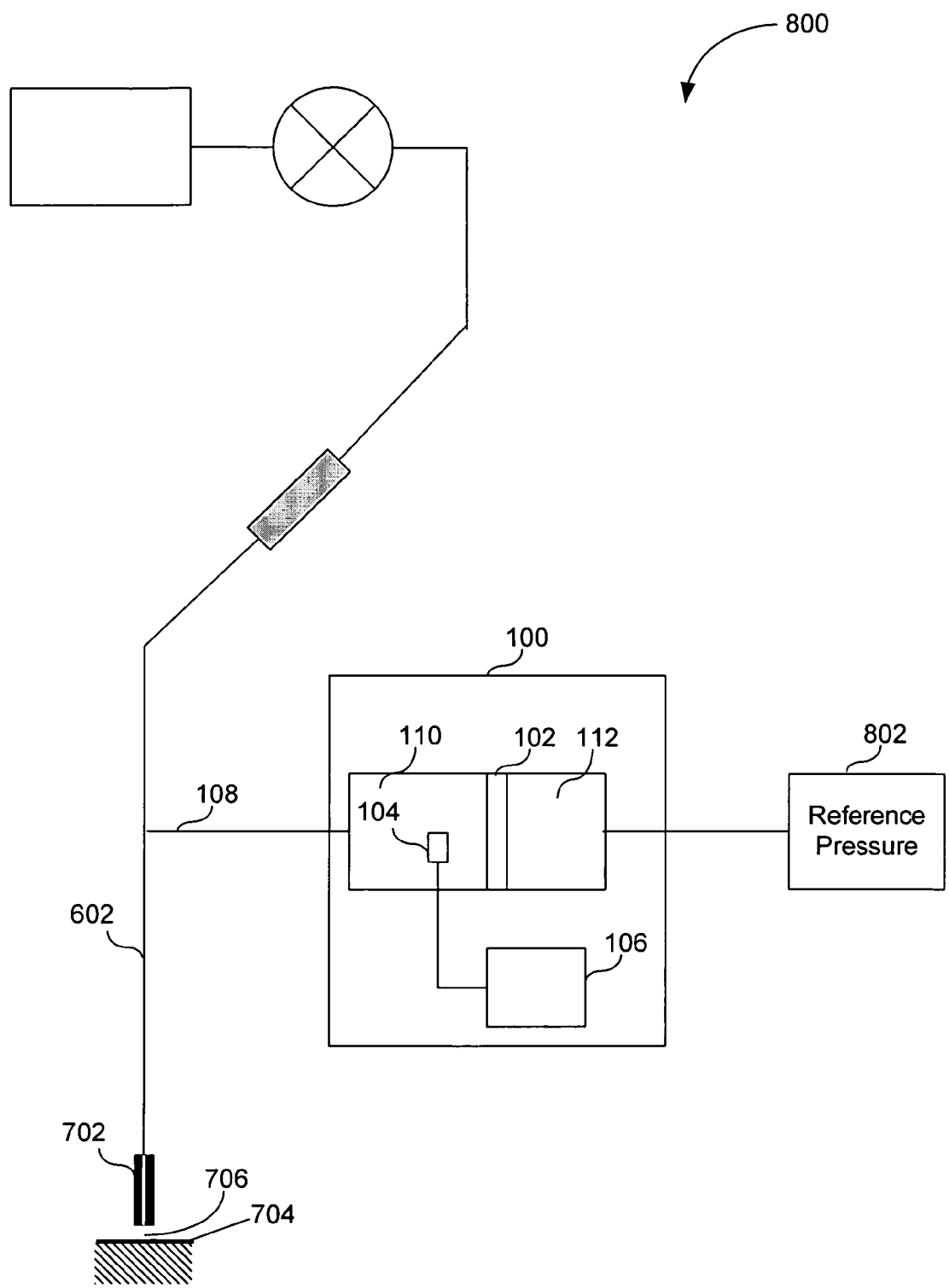
FIG. 8 is a side plan view of the pressure sensor 100 implemented in a proximity sensor 800.

Alternatively, the reference leg 604 and the reference probe 708 are replaced with a reference pressure. For example, FIG. 8 is a side plan view of a proximity sensor 800, in which the reference leg 604 is replaced with a reference pressure 802. The reference pressure 802 can be an ambient pressure or a controlled pressure.

VIII. CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A pressure gauge, comprising:
   a diaphragm having a displaceable semi-elastic inner portion, wherein the inner portion displaces in response to a pressure difference between first and second sides of the diaphragm;
   a light transmitting source;
   a light receiver, wherein the light transmitting source splits a light into a first light transmitted directly to the light receiver and into a second light transmitted to the first side of the diaphragm that is reflected to the light receiver;
   and
   a monitor and control system coupled to the light transmitting source and light receiver and adapted to determine the pressure difference from the displacement of the diaphragm.

2. The pressure gauge according to claim 1, further comprising an optically reflective coating on a first side of the diaphragm inner portion.

3. The pressure gauge according to claim 1,
   wherein the monitor and control system calculates the displacement of the diaphragm from an interference pattern generated from the first and second lights.

4. The pressure gauge according to claim 1, wherein the light transmitting source comprises a transmitting fiber having an output coupled to a diffraction device that separates a source light into the first and second lights, wherein changes in the diaphragm displacement cause the interference pattern to include intensity modulated light, wherein the monitor and control system calculates the diaphragm displacement from the intensity modulated light.

5. A pressure gauge, comprising:
a diaphragm having a displaceable semi-elastic inner portion, wherein the inner portion displaces in response to a pressure difference between first and second sides of the diaphragm;
a first light transmitting source outputting a first light at a first wavelength toward the first surface of the diaphragm;
a second light emitting source outputting a second light at a second wavelength toward the first surface of the diaphragm, wherein the second wavelength is phase shifted relative to the first wavelength;
a light receiver that receives the first light and second light;
and
a monitor and control system coupled to the first light transmitting source, the second light transmitting source and the light receiver, wherein changes in the diaphragm displacement cause the interference pattern to change with a substantially constant speed, wherein the monitor and control system comprises a counter that decodes the diaphragm displacement from the substantially constant speed.

6. A proximity sensor for lithography, comprising:
a measurement leg having a measurement probe coupled thereto, the measurement probe located proximate to a lithographic measurement surface;
a reference leg having a reference probe coupled thereto, the reference probe located proximate to a lithographic reference surface;
a bridge portion coupled between the measurement leg and the reference leg; and
a diaphragm pressure sensor disposed within the bridge portion, wherein the diaphragm pressure sensor detects changes in pressure in the measurement leg caused by a change in distance between the measurement probe and a lithographic measurement surface as compared to a distance between the reference probe and the lithographic reference surface, wherein the diaphragm pressure sensor comprises:
a diaphragm having a displaceable semi-elastic inner portion, wherein the inner portion displaces in response to a pressure difference between first and second sides of the diaphragm;
a light transmitting source;
a light receiver, wherein the light transmitting source splits a light into a first light transmitted directly to the light receiver and into a second light transmitted to the first side of the diaphragm that is reflected to the light receiver;
and
a monitor and control system coupled to the light transmitting source and light receiver and adapted to determine the pressure difference from the displacement of the diaphragm.

7. The pressure gauge according to claim 1, wherein the semi-elastic inner portion comprises a polyimide film.

8. The pressure gauge according to claim 1, wherein the semi-elastic inner portion comprises a thin polyester film.

9. The pressure gauge according to claim 1, wherein the semi-elastic inner portion comprises rubber.

* * * * *